US011948734B2

(12) United States Patent
Wang et al.

(10) Patent No.: US 11,948,734 B2
(45) Date of Patent: Apr. 2, 2024

(54) METHOD ABOUT INCREASING THE COERCIVITY OF A SINTERED TYPE NDFEB PERMANENT MAGNET

(71) Applicant: Yantai Shougang Magnetic Materials Inc, Shandong (CN)

(72) Inventors: Chuanshen Wang, Shandong (CN); Kunkun Yang, Shandong (CN); Zhongjie Peng, Shandong (CN); Kaihong Ding, Shandong (CN)

(73) Assignee: Yantai Shougang Magnetic Materials Inc, Shandong (CN)

( * ) Notice: Subject to any disclaimer, the term of this patent is extended or adjusted under 35 U.S.C. 154(b) by 638 days.

(21) Appl. No.: 17/105,533

(22) Filed: Nov. 26, 2020

(65) Prior Publication Data

US 2021/0166872 A1 Jun. 3, 2021

(30) Foreign Application Priority Data

Nov. 29, 2019 (CN) ........................ 201911198033.0

(51) Int. Cl.
*H01F 41/02* (2006.01)
*H01F 1/057* (2006.01)

(52) U.S. Cl.
CPC ....... *H01F 41/0293* (2013.01); *H01F 1/0577* (2013.01)

(58) Field of Classification Search
CPC ......................... H01F 41/0293; H01F 41/0253
See application file for complete search history.

(56) References Cited

U.S. PATENT DOCUMENTS

| | | | | |
|---|---|---|---|---|
| 7,559,996 B2 * | 7/2009 | Miyata | H01F 1/0577 310/156.01 |
| 2009/0252865 A1 * | 10/2009 | Sagawa | B22F 3/1039 427/127 |
| 2010/0282371 A1 * | 11/2010 | Sagawa | H01F 41/0293 427/127 |
| 2017/0333993 A1 * | 11/2017 | Lee | C22C 33/04 |
| 2020/0027657 A1 * | 1/2020 | Yang | C23C 10/30 |

FOREIGN PATENT DOCUMENTS

| | | | | |
|---|---|---|---|---|
| CN | 108831655 A | 11/2018 | |
| CN | 108962582 A | 12/2018 | |
| CN | 109564819 A | 4/2019 | |
| CN | 110459397 A | 11/2019 | |
| WO | 2007119271 A1 | 10/2007 | |
| WO | 2013061836 A1 | 5/2013 | |
| WO | WO-2018030187 A1 * | 2/2018 | B22F 3/00 |

* cited by examiner

*Primary Examiner* — Cachet I Proctor
(74) *Attorney, Agent, or Firm* — Samson G. Yu

(57) ABSTRACT

The invention relates to a method of increasing the coercivity of a sintered type NdFeB permanent magnet. The method comprises the following steps:

a) preparing of an organic film with a predetermined thickness on a surface of the sintered type NdFeB permanent magnet;
b) creating holes in the organic film according to a given pattern with the holes extending to the surface of the sintered type NdFeB permanent magnet;
c) filling the holes with a metal powder, the metal powder including or consisting of at least one of Dy and Tb; and
d) performing a thermally induced grain boundary diffusion process.

20 Claims, 2 Drawing Sheets

METHOD ABOUT INCREASING THE COERCIVITY OF A SINTERED TYPE NDFEB PERMANENT MAGNET

TECHNICAL FIELD

The invention relates to improving performance of sintered type NdFeB permanent magnets, and It is a method to attach the single substance or alloy of rare earth metal on sintered type NdFeB permanent magnet effectively and control the weight precisely. It is used in the diffusion source attachment process of sintered type NdFeB permanent magnets with grain boundary diffusion method.

BACKGROUND

With the increasingly high requirements for sintered type NdFeB permanent magnets in high-end applications (high magnetization and high magnetic energy product characteristics), considering factors such as cost, grain boundary diffusion has become one of the inevitable choices at present.

In 2005, Nakamura reported a simple and rapid way to increase coercivity by adding heavy rare-earth oxides and fluoride powders, which is called "grain boundary diffusion process". With the development of diffusion technology, two diffusion mechanisms are formed, that is, hardening $Nd_2Fe_{14}B$ main phase with heavy rare earth elements to the form a large number of core-shell structures or broadening and diluting grain boundary of ferromagnetic phase.

It can be seen that there are two steps to realize grain boundary diffusion: one is to attach rare earth metal or rare earth metal alloy on the surface of sintered type NdFeB permanent magnets, and the other is to diffuse the rare earth metal or rare earth metal alloy into sintered type NdFeB permanent magnets along the grain boundary. Domestic and foreign NdFeB manufacturers basically use the same diffusion scope of temperature, and their adhesion technologies have its own characteristics.

At present, the main adhesion methods of rare earth metal are as follows:

(1) The single substance or alloy of rare earth metal are attached to the surface of sintered type NdFeB permanent magnets by vacuum coating or thermal spraying; (2) The single substance or alloy of rare earth metal or compounds of heavy rare earth are mixed with organic solvents to form a suspension and then attached to the surface of sintered type NdFeB permanent magnets by coating or electrophoresis. The above two methods have different defects:

In the process of vacuum coating or thermal spraying, most of the heavy rare earth metal will deposit in the coating room or on the discharge tray rather than on the NdFeB magnets, resulting in low utilization rate of rare earth metal. Moreover, the equipment required by such a process is expensive, which is not suitable for industrial production. The production cost of coating or electrophoresis method is low and the production efficiency is high. But this method requires the preparation of organic suspension, so a large amount of organic solvent is needed. However, organic solvent is volatile, and metal powder precipitation is easy to precipitate, resulting in poor coating uniformity and not easy mass production.

Patent literatures CN104299744 A proposes that the suspension is spread on the screen mesh by coating, then drying it, and placing it on the sandwich of sintered type NdFeB permanent magnets and being on diffusion treatment. However, there are some problems in this method, such as easy deformation of the screen mesh, adhesion on the surface of the magnet, high cost, bad contact and easy to cause the waste of the diffusion source. Patent literatures CN105957679 A discloses that the heavy rare earth plate is separated from sintered type NdFeB permanent magnets by molybdenum mesh for repeated usage diffusion. Suspension made of alcohol, gasoline or paint is coated on the surface of the magnet and then diffused, but this method is extremely difficult for mass production due to its characteristics of high volatility, high toxicity and poor controllability.

SUMMARY

For overcoming deficiencies of the prior art, a novel method for increasing the coercivity of a sintered type NdFeB permanent magnet is provided. The method comprises the following steps:

a) preparing of an organic film with a predetermined thickness on a surface of the sintered type NdFeB permanent magnet;
b) creating holes in the organic film according to a given pattern with the holes extending to the surface of the sintered type NdFeB permanent magnet;
c) filling the holes with a metal powder, the metal powder including or consisting of at least one of Dy and Tb; and
d) performing a thermally induced grain boundary diffusion process.

According to one embodiment, step c) further includes compacting of the metal powder filled into the holes, followed by a heat treatment at 50° C. to 180° C. for solidifying the compacted metal powder, and removing of unsolidified metal powder. Compacting of the metal powders may be achieved by pressing an elastic panel against the filled holes of the organic film. The pressing force may be greater than or equal to 0.5 MPa.

Filling of the holes in step c) may be supported by vibration of the magnet. A vibration frequency may be in the range of 5 Hz to 20 Hz.

According to another embodiment, a thickness of the sintered type NdFeB permanent magnet is in the range of 0.5 to 10 mm.

According to another embodiment, the thickness of the organic film is in the range of 5 to 100 μm.

According to another embodiment, the organic film comprises a solid organosilicon compound, a solid polymer material, or a solidified adhesive. In particular, the organic film may comprise a silicone resin, a polyacrylate, polymethylmethacrylate or a hot melt adhesive.

According to another embodiment, creating holes in step b) is performed by laser treatment, mechanical micro-drilling or chemical etching.

According to another embodiment, the holes have a spacing from each other in the range of 0.5 to 1.5 mm.

According to another embodiment, the metal powder further comprises one or more metals of the group consisting of Pr, Nd, La, Ce, Cu, Al, Zn, Ga, Sn, Mg and Fe.

According to another embodiment, the holes have an average diameter in the range of 200 to 2000 μm.

According to another embodiment, step d) of performing the grain boundary diffusion process includes a heat treatment step at 750° C. to 950° C. for 6 to 72 h, and an aging step at 450° C. to 650° C. for 3-15 h.

The organic film may be prepared in step a) by a process including spraying, screen printing, dip coating, roller coating, brush coating or rotary coating. Spraying is preferred.

According to another embodiment, the surface of sintered type NdFeB permanent magnets is coated with the same thickness of an organic film, and cured and dried. Then the array holes on the organic film is prepared. Metal powders are evenly spread on the organic film of sintered type NdFeB permanent magnet using a vertical ultrasonic vibration technique to shake the metal powders into the array holes. The powders are compacted by an elastic organic panel. The metal powders in the array holes are then slightly heated at a temperature of 50-120° C. thereby solidifying the metal powders. Then powder remaining on the surface of sintered type NdFeB permanent magnet is cleared. The sintered type NdFeB permanent magnets are then treated by diffusion heating and aged.

Beneficial effects of present invention: The invention combines the accuracy of controlling the organic film coating thickness, the forming of array holes, the paving and filling of the powders into the holes, and the micro melting of compacted powders in the holes. Thereby a high precision control of the weights of Dy/Tb rare earth metals or its alloys on the surface of sintered type NdFeB permanent magnets could be achieved. The method has further the following advantages:

1. According to the principle of diffusion overlapping in sintered type NdFeB permanent magnets, the distribution of rare earth metal or its alloy powders in array poles can improve the utilization efficiency of diffusion source.
2. The number of holes, the distance of the holes to each other and the dimensions of the holes formed in the organic film as well as the thickness of the organics film can control the weight of Dy/Tb powders or its alloy powders on the surface of sintered type NdFeB permanent magnets.
3. Micro-melting of film array holes can fix the diffusion source powders and can carry double-side simultaneous load, improving the efficiency of the process.
4. By spraying the organic film layer, special-shaped magnets or magnets with specific diffusion requirements (i.e. conducive to local diffusion or positioning diffusion) can be manufactured.
5. The process is simplified and the cost for the porous templates are low. There is no need to recycle the organic film material.

DETAILED DESCRIPTION OF THE EMBODIMENTS

Figure 1:
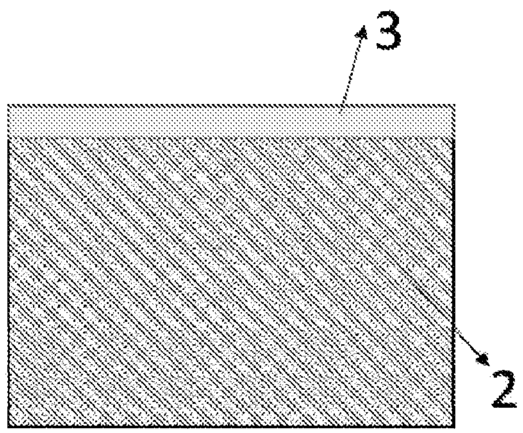
FIG. 1 is a schematic illustration of coating of an organic film on a magnet.

The principles and features of the invention are described below, and the examples are only intended to be illustrated and not to limit the scope of the invention as defined by the present claims.

The exemplary embodiment of the method comprises with respect to the illustrations of FIGS. 1 through 5 the following steps:

a) preparing of an organic film 3 with a predetermined thickness on a surface of a sintered type NdFeB permanent magnet 2;

b) creating holes 4 in the organic film 3 according to a given pattern with the holes 4 extending to the surface of the sintered type NdFeB permanent magnet 2;

c) filling the holes 4 with a metal powder 1, the metal powder 1 including or consisting of at least one of Dy and Tb; and d) performing a thermally induced grain boundary diffusion process.

Figure 2:
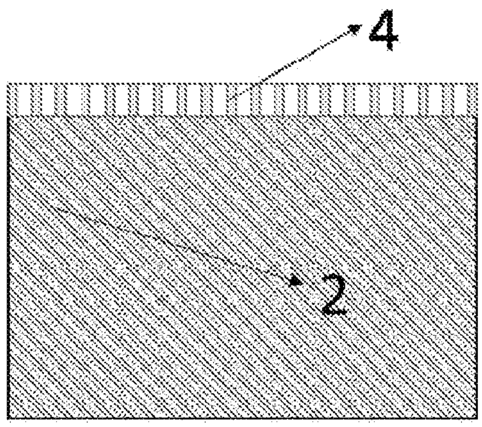
FIG. 2 is a schematic illustration of preparing of an array of holes in the organic film.
Figure 3:
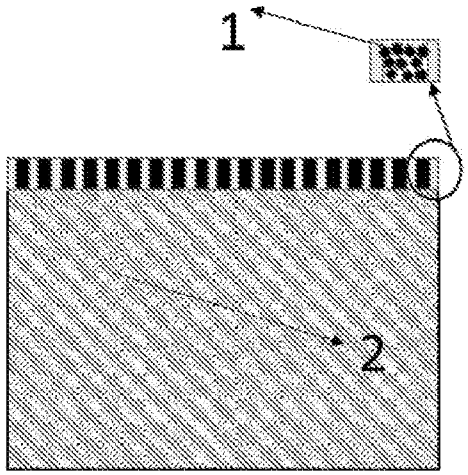
FIG. 3 is a schematic illustration of depositing a metal powder in film array holes.
Figure 4:
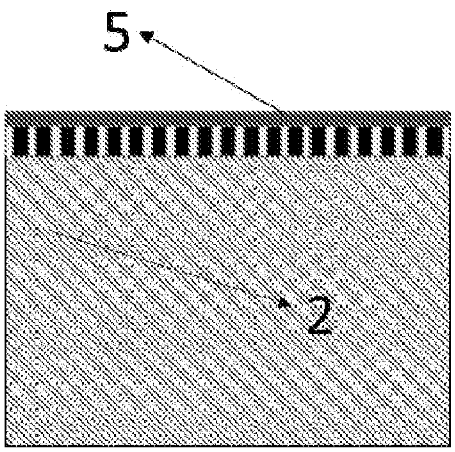
FIG. 4 is a schematic illustration of compacting the powders by an elastic organic panel.
Figure 5:
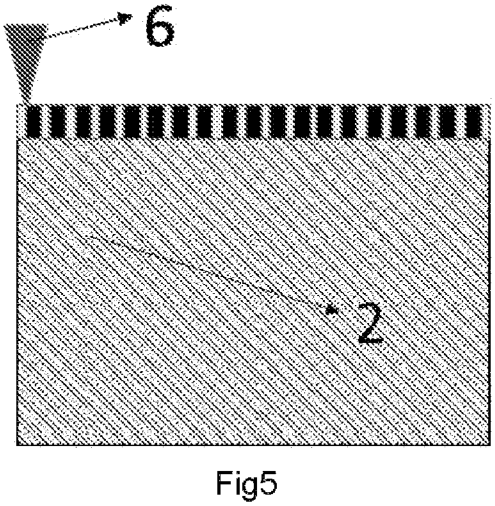
FIG. 5 is a schematic illustration of clearing of surface powders.

FIG. 1 schematically illustrates the coating of the organic film 3 on the sintered type NdFeB permanent magnet 2. FIG. 2 illustrates preparing of an array of holes 4 in the organic film 3. FIG. 3 illustrates depositing the metal powder 1 in film array holes. FIG. 4 illustrates compacting the metal powder 1 by an elastic organic panel 5. FIG. 5 illustrates clearing of surface powders by means of a flexible wedge plate 6.

Step c) includes compacting of the metal powder 1 filled into the holes 4, followed by a heat treatment at 50° C. to 180° C. for solidifying the compacted metal powder, and removing of unsolidified metal powder. Compacting of the metal powders may be achieved by pressing an elastic panel 5 against the filled holes 1 of the organic film 3. The pressing force may be greater than or equal to 0.5 MPa.

Filling of the holes 4 in step c) is supported by vibration of the magnet 2. A vibration frequency may be in the range of 5 Hz to 20 Hz.

A thickness of the sintered type NdFeB permanent magnet is in the range of 0.5 to 10 mm.

The thickness of the organic film 3 is in the range of 5 to 100 μm. The organic film 3 comprises a solid organosilicon compound, a solid polymer material, or a solidified adhesive. In particular, the organic film 3 may comprise a silicone resin, a polyacrylate, polymethylmethacrylate or a hot melt adhesive.

Creating holes 4 in step b) is performed by laser treatment, mechanical micro-drilling or chemical etching. Laser treatment is preferred.

The holes 4 have a spacing from each other in the range of 0.5 to 1.5 mm. They may have a predetermined average diameter.

The metal powder may further comprise one or more metals of the group consisting of Pr, Nd, La, Ce, Cu, Al, Zn, Ga, Sn, Mg and Fe.

Step d) of performing the grain boundary diffusion process may include a heat treatment step at 750° C. to 950° C. for 6 to 72 h, and an aging step at 450° C. to 650° C. for 3-15 h.

The organic film may be prepared in step a) by a process including spraying, screen printing, dip coating, roller coating, brush coating or rotary coating. Spraying is preferred.

Example 1

Opposite sides of a sintered type NdFeB permanent magnet with 20*20*3 T were coated with a solution comprising an organosilicon resin by spraying. The coating was dried and solidified and the resulting organic film had a thickness of 25 μm.

An array of holes was formed in the organic film by laser treatment. The spacing of the holes was about 0.5 mm to 1.5 mm. A diameter of the holes was about 200 μm.

Dy metal powder (particle average diameter 1 μm) was evenly paved on the surface of sintered type NdFeB permanent magnets, respectively the array of holes. The metal powder was vibrated into the holes at a vibration frequency of 5 Hz. The metal powder in the array holes of the organic film was compacted with an elastic organic panel and the pressure was 0.5 MPa. The organic film was micro-heated to solidify the powder at 80° C. With a flexible wedge plate the remaining metal powder was cleared from the surface of the organic film.

The magnet was turned 180° and the procedure was repeated on the opposite side. The weight of the solidified Dy powders on each side was 0.4 wt % related to the weight of the sintered type NdFeB permanent magnet. The covered magnet was sintered in a furnace for 10 h at 900° C. Thereafter, the magnet was cooled down in the furnace and continued to heat up for 6 h at 500° C.

Test results of sintered NdFeB permanent magnet of Example 1 are shown in Table 1:

TABLE 1

| | Br (T) | Hcj (kA/m) | Hk/Hcj |
|---|---|---|---|
| Original example | 1.415 | 1432 | 0.97 |
| Example 1 | 1.405 | 1874.58 | 0.96 |

As shown in Table 1, the remanence decreases by 0.01 T, the coercivity increases by 442.58 kA/m, and the squareness of Example 1 changes little compared to the original magnet.

Example 2

Opposite sides of a sintered type NdFeB permanent magnet with 20*20*10 T were coated with a solution comprising polymethylmethacrylate (Plexiglass©) by spraying. The coating was dried and solidified and the resulting organic film had a thickness of 100 μm.

An array of holes was formed in the organic film by laser treatment. The spacing of the holes was about 0.5 mm to 1.5 mm. A diameter of the holes was about 2000 μm.

Tb metal powder (particle average diameter 5 μm) was evenly paved on the surface of sintered type NdFeB permanent magnets, respectively the array of holes. The metal powder was vibrated into the holes at a vibration frequency of 10 Hz. The metal powder in the array holes of the organic film was compacted with an elastic organic panel and the pressure was 1.0 MPa. The organic film was micro-heated to solidify the powder at 120° C. With a flexible wedge plate the remaining metal powder was cleared from the surface of the organic film.

The magnet was turned 180° and the procedure was repeated on the opposite side. The weight of the solidified Tb powders on each side was 0.4 wt % related to the weight of the sintered type NdFeB permanent magnet. The covered magnet was sintered in a furnace for 6 h at 950° C. Thereafter, the magnet was cooled down in the furnace and continued to heat up for 6 h at 500° C.

Test results of sintered NdFeB permanent magnet of Example 2 are shown in Table 2:

TABLE 2

| | Br (T) | Hcj (kA/m) | Hk/Hcj |
|---|---|---|---|
| Original example | 1.415 | 1432 | 0.97 |
| Example 2 | 1.41 | 2197 | 0.96 |

As shown in Table 2, the remanence decreases by 0.005 T, the coercivity increases by 765 kA/m, and the squareness of Example 2 changes little compared to the original magnet.

Example 3

Opposite sides of a sintered type NdFeB permanent magnet with 20*20*2 T were coated with a solution comprising a rubber adhesive by silk-screen printing. The coating was dried and solidified and the resulting organic film had a thickness of 20 μm.

An array of holes was formed in the organic film by laser treatment. The spacing of the holes was about 0.5 mm to 1.5 mm. A diameter of the holes was about 500 μm.

$Pr_{35}Dy_{35}Cu_{30}$ metal powder (particle average diameter 2 μm) was evenly paved on the surface of sintered type NdFeB permanent magnets, respectively the array of holes. The metal powder was vibrated into the holes at a vibration frequency of 15 Hz. The metal powder in the array holes of the organic film was compacted with an elastic organic panel and the pressure was 1.2 MPa. The organic film was micro-heated to solidify the powder at 50° C. With a flexible wedge plate the remaining metal powder was cleared from the surface of the organic film.

The magnet was turned 180° and the procedure was repeated on the opposite side. The weight of the solidified Tb powders on each side was 0.45 wt % related to the weight of the sintered type NdFeB permanent magnet. The covered magnet was sintered in a furnace for 72 h at 850° C. Thereafter, the magnet was cooled down in the furnace and continued to heat up for 15 h at 450° C.

Test results of sintered NdFeB permanent magnet of Example 3 are shown in Table 3:

TABLE 3

| | Br (T) | Hcj (kA/m) | Hk/Hcj |
|---|---|---|---|
| Original example | 1.393 | 1504 | 0.97 |
| Example 3 | 1.370 | 2077 | 0.96 |

As shown in Table 3, the remanence decreases by 0.023 T, the coercivity increases by 573 kA/m, and the squareness of Example 3 changes little compared to the original magnet.

Example 4

Opposite sides of a sintered type NdFeB permanent magnet with 20*20*4 T were coated with a solution comprising a hot melt adhesive by roller coating. The coating was dried and solidified and the resulting organic film had a thickness of 30 μm.

An array of holes was formed in the organic film by mechanical micro-drilling. The spacing of the holes was about 0.5 mm to 1.5 mm. A diameter of the holes was about 800 μm.

Pr52.5Tb17.5Cu30 metal powder (particle average diameter 3 μm) was evenly paved on the surface of sintered type NdFeB permanent magnets, respectively the array of holes. The metal powder was vibrated into the holes at a vibration frequency of 20 Hz. The metal powder in the array holes of the organic film was compacted with an elastic organic panel and the pressure was 2 MPa. The organic film was micro-heated to solidify the powder at 100° C. With a flexible wedge plate the remaining metal powder was cleared from the surface of the organic film.

The magnet was turned 180° and the procedure was repeated on the opposite side. The weight of the solidified Tb powders on each side was 0.6 wt % related to the weight of the sintered type NdFeB permanent magnet. The covered magnet was sintered in a furnace for 72 h at 750° C. Thereafter, the magnet was cooled down in the furnace and continued to heat up for 3 h at 650° C.

Test results of sintered NdFeB permanent magnet of Example 4 are shown in Table 4:

TABLE 4

| | Br (T) | Hcj (kA/m) | Hk/Hcj |
|---|---|---|---|
| Original example | 1.393 | 1504 | 0.97 |
| Example 4 | 1.383 | 2189 | 0.96 |

As shown in Table 4, the remanence decreases by 0.01 T, the coercivity increases by 685 kA/m, and the squareness of Example 4 changes little compared to the original magnet.

Example 5

Example 5 complies with Example 1 except that the spacing of the holes in the array was 2 mm. Other parameters were the same as Example 1.

Test results of magnetic properties of sintered NdFeB permanent magnets of Example 5 and Example 1 are shown in Table 5.

TABLE 5

| | Br (T) | Hcj (kA/m) | Hk/Hcj |
|---|---|---|---|
| Example 1 | 1.405 | 1874.58 | 0.96 |
| Example 5 | 1.39 | 1814 | 0.95 |

It can be seen from Table 5 that the remanence of Example 5 is 0.015 T lower than Example 1, the coercivity of Example 1 is bigger than of Example 5 and the squareness of Example 5 reduced to 0.95.

Example 6

Example 6 complies to Example 1 except that the vibration frequency is different. That is to say, the metal powders are vibrated into array holes of the organic film at a vibration frequency of 30 Hz.

Test results of magnetic properties of sintered NdFeB permanent magnets of Example 6 and Example 1 are shown in Table 6.

TABLE 6

| | Br (T) | Hcj (kA/m) | Hk/Hcj |
|---|---|---|---|
| Example 1 | 1.405 | 1874.58 | 0.96 |
| Example 6 | 1.4 | 1820 | 0.96 |

It can be seen from Table 6 that the remanence of Example 6 is 0.005 T lower than Example 1, the coercivity of Example 1 is bigger than of Example 6 and the squareness of Example 6 has no change.

Example 7

Example 7 complies to Example 1 except that the pressure is different. That is to say, the metal powders in the array holes of the organic film were compacted with the elastic organic panel at a pressure of 0.2 MPa.

Test results of magnetic properties of sintered NdFeB permanent magnets of Example 7 and Example 1 are shown in Table 7.

TABLE 7

| | Br (T) | Hcj (kA/m) | Hk/Hcj |
|---|---|---|---|
| Example 1 | 1.405 | 1874.58 | 0.96 |
| Example 7 | 1.405 | 1800 | 0.96 |

It can be seen from Table 7 that the remanence has no change, the coercivity of Example 1 is bigger than of Example 7 and the squareness of Example 7 has no change.

What is claimed is:

1. A method for increasing the coercivity of a sintered type NdFeB permanent magnet (2), the method comprising the following steps:

a) preparing of an organic film (3) with a predetermined thickness on a surface of the sintered type NdFeB permanent magnet (2);

b) creating holes (4) in the organic film (3) according to a given pattern with the holes (4) extending to the surface of the sintered type NdFeB permanent magnet (2);

c) filling the holes (4) with a metal powder (1), the metal powder (1) including or consisting of at least one of Dy and Tb; and d) performing a thermally induced grain boundary diffusion process.

2. The method according to claim 1, wherein step c) further includes compacting of the metal powder (1) filled into the holes (4), followed by a heat treatment at 50° C. to 180° C. for solidifying the compacted metal powder, and removing of unsolidified metal powder (1).

3. The method according to claim 2, wherein a thickness of the sintered type NdFeB permanent magnet (2) is in the range of 0.5 to 10 mm.

4. The method according to claim 2, wherein the thickness of the organic film (3) is in the range of 5 to 100 μm.

5. The method according to claim 2, wherein the organic film (3) comprises a solid organosilicon compound, a solid polymer material, or a solidified adhesive.

6. The method according to claim 2, wherein creating holes (4) in step b) is performed by laser treatment, mechanical micro-drilling or chemical etching.

7. The method according to claim 1, wherein a thickness of the sintered type NdFeB permanent magnet (2) is in the range of 0.5 to 10 mm.

8. The method according to claim 7, wherein the thickness of the organic film (3) is in the range of 5 to 100 μm.

9. The method according to claim 7, wherein the organic film (3) comprises a solid organosilicon compound, a solid polymer material, or a solidified adhesive.

10. The method according to claim 1, wherein the thickness of the organic film (3) is in the range of 5 to 100 μm.

11. The method according to claim 10, wherein the organic film (3) comprises a solid organosilicon compound, a solid polymer material, or a solidified adhesive.

12. The method according to claim 1, wherein the organic film (3) comprises a solid organosilicon compound, a solid polymer material, or a solidified adhesive.

13. The method according to claim 12, wherein the organic film (3) comprises a silicone resin, a polyacrylate, polymethylmethacrylate or a hot melt adhesive.

14. The method according to claim 1, wherein creating holes (4) in step b) is performed by laser treatment, mechanical micro-drilling or chemical etching.

15. The method according to claim 1, wherein the holes (4) have a spacing from each other in the range of 0.5 to 1.5 mm.

16. The method according to claim 1, wherein the metal powder (1) includes at least one of Dy and Tb and further comprises one or more metals of the group consisting of Pr, Nd, La, Ce, Cu, Al, Zn, Ga, Sn, Mg and Fe.

17. The method according to claim 1, wherein the holes (4) have an average diameter in the range of 200 to 2000 μm.

18. The method according to claim 1, wherein filling of the holes (4) in step c) is supported by vibration of the sintered type NdFeB permanent magnet (2).

19. The method according to claim 1, wherein a vibration frequency is in the range of 5 Hz to 20 Hz.

20. The method according to claim 18, wherein step d) of performing the grain boundary diffusion process includes a heat treatment step at 750° C. to 950° C. for 6 to 72 h, and an aging step at 450° C. to 650° C. for 3-15 h.

* * * * *